(No Model.)
C. F. GILLETT.
POTATO PLANTER.
No. 466,849. Patented Jan. 12, 1892.
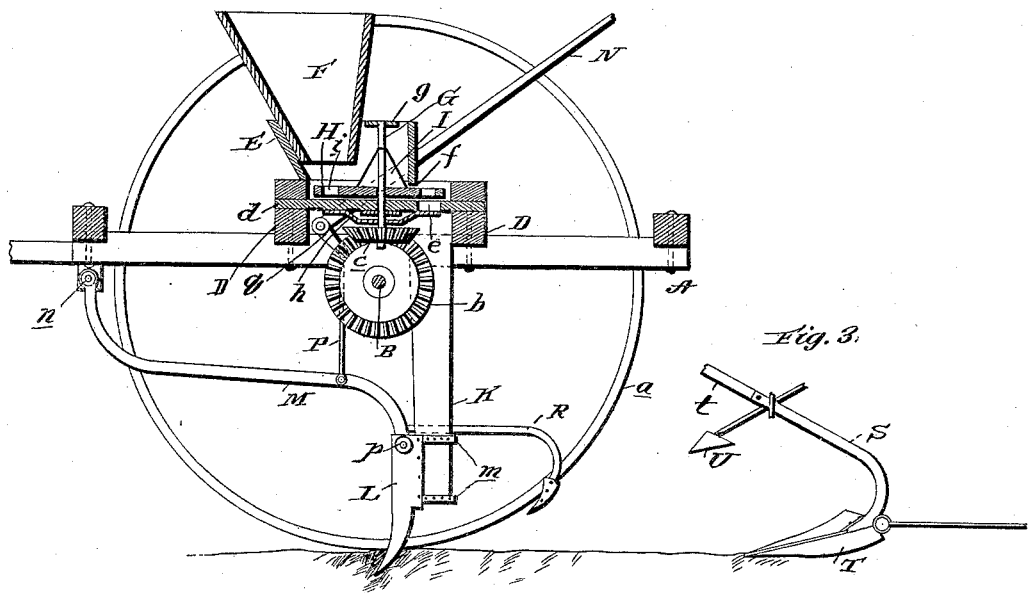
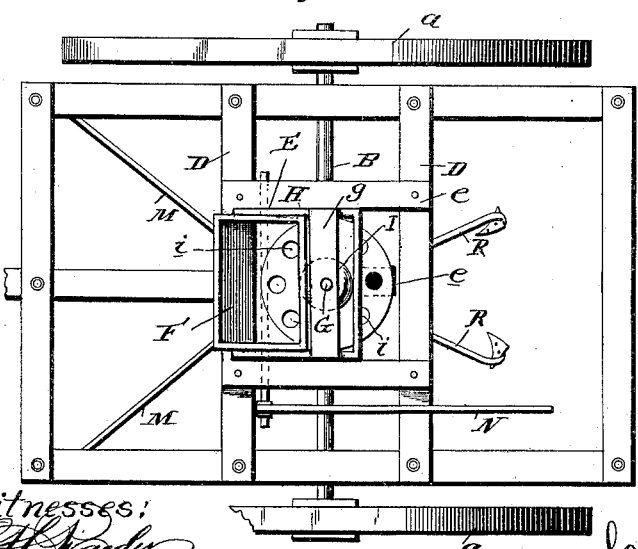
Witnesses:
Inventor
Celebrate F. Gillett
by James J. Sheehy
Attorney.

UNITED STATES PATENT OFFICE.

CELEBRATE F. GILLETT, OF CORVALLIS, OREGON.

POTATO-PLANTER.

SPECIFICATION forming part of Letters Patent No. 466,849, dated January 12, 1892.

Application filed September 10, 1891. Serial No. 405,342. (No model.)

*To all whom it may concern:*

Be it known that I, CELEBRATE F. GILLETT, a citizen of the United States, residing at Corvallis, in the county of Benton and State of Oregon, have invented certain new and useful Improvements in Potato-Planters; and I do declare the following to be a full, clear, and exact description of the invention, such as will enable others skilled in the art to which it appertains to make and use the same.

This invention relates to an improvement in potato-planters; and, among other things, it has for its object to provide a cheap and simple means for planting at regular intervals. A further object of the invention is to plant in regular quantities and provide devices whereby the furrow opener and coverers may be adjusted vertically and also arranged out of the way when the machine is not in use or when being transported from place to place.

The invention will be fully understood from the following description and claim, when taken in connection with the annexed drawings, in which—

Figure 1 is a longitudinal vertical central sectional view of my improved planter. Fig. 2 is a plan view of the same. Fig. 3 is a side view of a device which I have provided for digging potatoes, and Fig. 4 is a plan view of the same.

Referring by letter to said drawings, A indicates the main frame of my improved machine. This frame is preferably of a rectangular form in outline, and is composed of transverse and longitudinal bars of wood and other suitable material properly secured together. This frame has journaled in suitable bearings on its central under side a transverse shaft B, carrying at opposite ends fixed driving and supporting wheels $a$. This shaft has also fixed to it, about midway of its length or any suitable point thereof, a vertically-disposed miter or bevel gear $b$, which is designed to mesh with a horizontally-disposed similar gear or pinion $c$, supported as will be presently described.

D indicates two parallel transverse beams secured at opposite ends to the side bars of the main frame. On these beams is arranged a horizontal base-plate $d$, provided with a vertical opening $e$.

E indicates a hopper, which is suitably arranged upon the base-plate or cross-beams of the main frame. This hopper is provided in its rear wall and at the lower side thereof with a slot $f$, for a purpose which will be presently explained, and the plate $d$ may furnish the base of said hopper. Arranged upon this lower hopper E is another upper or larger hopper F, which is designed to hold a sufficient quantity of seed-potatoes and deliver the same into the lower hopper, as will be presently explained.

G indicates a vertical shaft, which bears at its upper end in a plate or cross-bar $g$ and near its lower end in a plate or bar $h$. This vertical shaft has secured to its lower end the horizontally-disposed beveled gear or pinion $c$, and within the hopper said shaft is secured to a dropping-plate H, to which it is designed to impart a continuous rotary motion.

I indicates a cone, which is arranged upon the dropping-plate in the center thereof and surrounds the shaft G, so as to direct the seed-potatoes as they are delivered from the upper hopper to the outer edge or periphery of said dropping-plate. The dropping-plate H is provided with a suitable number of vertical holes adjacent to its periphery, as shown at $i$, there being preferably eight employed, and these holes are designed to successively pass over the opening $e$ in the base-plate, so as to discharge their contents through the same and into the delivery-spout K. The spout K is suitably secured to the frame at its upper end at a point beneath the opening $e$ in the base-plate, and its opposite end extends down to within a convenient distance of the surface of the ground. The tube K is preferably made of flexible material, although it may be made of any material desired.

It will be observed that the hole $e$ in the base-plate is at a point outside the rear wall of the lower hopper E, and that the dropping-plate passes during its rotation through the slot in said hopper, so that but one hole in the dropping-plate can register with the hole in the base-plate at a time.

L indicates the plow or furrow-opener. This furrow-opener is secured to the lower end of the dropper tube or spout by any suitable means. In the present illustration I have the opener L connected to said tube by means of loops m, although it is obvious that other means might be employed.

M indicates an arm or bar, which is preferably of a shape as shown. This arm or bar is pivoted at its forward end to the forward portion of the main frame, as shown at n, and its opposite or lower end is secured to the opener L, as shown at p, so that said opener may be allowed a vertical movement.

N indicates a hand-lever. This hand-lever has an angular toe or branch q at one end, and is journaled in the main frame, as shown. P indicates a rod which depends from the outer end of the branch q of the hand-lever, and is connected at its opposite or lower end to the arm M, as shown, if desirable, and it is preferable to have a rack or other suitable holding device for the hand-lever, so as to secure said handle in a suitably-depressed position. It is obvious that any suitable means may be employed for holding this handle at such times as when the plow or furrow-opener has been raised out of operation and the dropping mechanism is not in use; but I prefer a segmental rack, as by such means the lever may be locked in any desired position and the plow or furrow-opener adjusted for any desired depth in the ground.

R indicates covering shovels or plows. These plows or shovels, which are pitched in opposite directions and concaved or dish-shaped, as shown, have their arms secured at their forward ends to the arm M and are arranged at a suitable altitude in rear of the dropping-spout, so as to gather the soil and carry the same into the furrow, thereby covering the potatoes as they are deposited.

In operation a suitable quantity of seed-potatoes are placed in the hopper F. The plow or furrow-opener L having been let down to the point desired, the team is then started, and as the wheels A turn motion is imparted to the axle B, and from thence through the medium of the gear b motion is imparted to the gear or pinion c, and from said pinion through the shaft G a rotary motion is imparted to the horizontal dropping-plate H. It will thus be seen that as the seed-potatoes fall from the upper hoppers into the lower one the dropping-plate, having a rotary motion, will have its holes i filled as they successively come beneath the discharge end of the upper hopper, and such holes carrying the seed-potatoes coming over the discharge-hole in the base-plate will drop such potatoes at regular intervals into the tube or spout K, from which they are deposited into the furrow.

In Figs. 3 and 4 of the drawings I have represented a device designed for digging potatoes, and such device may be attached to the main frame of my planter when the delivery-spout, furrow-opener, and coverers have been removed. This digging device comprises a suitably-curved beam S, provided at its lower end with a broad plow blade or spade T, having its forward edge tapering to a central point, as shown. The opposite end of this beam S is provided with two oppositely-deflecting branches t for attachment to the main frame A. U indicates a plow or a point, which is preferably of V shape. This point is designed to travel in advance of the main blade or spade T, and is secured at its shank or arm to the beam S by means of a yoke, set-screw, or other fastening device. Fixed to the heel of the blade or spade T and arranged at a suitable altitude in a rearward position I provide a plurality of tines or fingers, the purposes of which are to pulverize the soil, so as to separate the potatoes therefrom as they are turned out of the furrow by the blade T.

Having described my invention, what I claim, and desire to secure by Letters Patent, is—

A machine for planting potatoes, comprising the main frame A, the parallel transverse beams D, arranged centrally thereon, the base-plate d, arranged upon said transverse bars having a vertical hole therein, the hopper E, arranged above said base-plate and having its rear wall provided with the horizontal slot f, the hopper F, arranged above the hopper E to discharge therein, the vertical shaft arranged in the hopper E and in rear of the hopper F and bearing at its upper end in the cross-bar g, the dropping-plate H, having the holes i and secured to the vertical shaft so as to work in the slot of the hopper E, the cone I, secured to said vertical shaft upon the dropping-plate and below the discharge end of the upper hopper, the horizontal gear c, fixed to the lower end of the shaft G, the supporting-wheels, the axle B, the vertically-disposed bevel-gear fixed to said axle, the dropping-tube leading from the hole in the base-plate d, the furrow-opener secured to the lower end of said tube, and covering-shovels also secured to said tube, all combined to operate substantially as and for the purpose specified.

In testimony whereof I affix my signature in presence of two witnesses.

CELEBRATE F. GILLETT.

Witnesses:
SAMUEL HITCHENS,
JOHN BURNETT.